(12) United States Patent
Albert et al.

(10) Patent No.: US 10,677,216 B2
(45) Date of Patent: Jun. 9, 2020

(54) WIND TURBINE ROTOR BLADE COMPONENTS FORMED USING PULTRUDED RODS

(71) Applicant: General Electric Company, Schenectady, NY (US)

(72) Inventors: Bensely Albert, Greenville, SC (US); Nicholas K. Althoff, La Crosse, WI (US); Jamie T. Livingston, Simpsonville, SC (US); Stephen Bertram Johnson, New Castle, NH (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 15/791,705

(22) Filed: Oct. 24, 2017

(65) Prior Publication Data

US 2019/0120203 A1    Apr. 25, 2019

(51) Int. Cl.
  *F03D 1/06* (2006.01)
  *B29D 99/00* (2010.01)
  (Continued)

(52) U.S. Cl.
  CPC .......... *F03D 1/0675* (2013.01); *B29C 70/682* (2013.01); *B29D 99/0025* (2013.01);
  (Continued)

(58) Field of Classification Search
  CPC .... F01D 1/0641; F01D 1/0675; F01D 1/0683; B29C 70/52; B29C 70/682;
  (Continued)

(56) References Cited

U.S. PATENT DOCUMENTS

| 1,415,620 A | 5/1922 | Albrecht |
| 4,264,278 A | 4/1981 | Weingart |

(Continued)

FOREIGN PATENT DOCUMENTS

| CN | 2670606 Y | 1/2005 |
| CN | 102022288 A | 4/2011 |

(Continued)

OTHER PUBLICATIONS

Bundy, Use of Pultruded Carbon Fiber/Epoxy Inserts as Reinforcement in Composite Structures, Thesis for degree of Master of Science in Mechanical Engineering, Montana State University, Dec. 2005, pp. 1-325.

(Continued)

*Primary Examiner* — David E Sosnowski
*Assistant Examiner* — Sang K Kim
(74) *Attorney, Agent, or Firm* — Dority & Manning, P.A.

(57) ABSTRACT

Wind turbine rotor blade components including pultruded rods and methods of manufacturing the same are disclosed. More specifically, the rotor blade component includes a plurality of pultruded rods housed within an enclosed primary outer casing. The enclosed primary outer casing includes a hollow interior, a root end, and an opposing tip. As such, each of the plurality of pultruded rods is received within the enclosed primary outer casing and secured therein via a first resin material. Further, an arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component.

20 Claims, 11 Drawing Sheets

(51) Int. Cl.
    *B29C 70/68*  (2006.01)
    *B32B 5/00*   (2006.01)
    B29C 70/52    (2006.01)
    B29L 31/08    (2006.01)

(52) U.S. Cl.
    CPC .............. *B32B 5/00* (2013.01); *F03D 1/0641*
    (2013.01); *B29C 70/52* (2013.01); *B29L*
    *2031/085* (2013.01); *F05B 2230/23* (2013.01);
    *F05B 2240/221* (2013.01); *F05B 2240/301*
    (2013.01); *F05B 2280/6003* (2013.01); *F05B*
    *2280/6014* (2013.01); *F05B 2280/6015*
    (2013.01)

(58) Field of Classification Search
    CPC . B29D 99/0025; B32B 5/00; B29L 2031/085;
    F05B 2240/221; F05B 2240/301; F05B
    2280/6003; F05B 2280/6014; F05B
    2280/6015
    See application file for complete search history.

(56) References Cited

U.S. PATENT DOCUMENTS

| | | | |
|---|---|---|---|
| 4,915,590 A | 4/1990 | Eckland et al. | |
| 5,026,447 A | 6/1991 | O'Conner | |
| 5,476,704 A | 12/1995 | Kohler | |
| 5,499,904 A | 3/1996 | Wallace et al. | |
| 5,660,527 A | 8/1997 | Deering et al. | |
| 6,443,701 B1 | 9/2002 | Miühlbauer | |
| 7,037,568 B1 | 5/2006 | Rogers et al. | |
| 7,163,378 B2 | 1/2007 | Kildegaard | |
| 7,198,471 B2 | 4/2007 | Gunneskov et al. | |
| 7,357,726 B2 | 4/2008 | Thorning | |
| 7,438,533 B2 | 10/2008 | Eyb et al. | |
| 7,503,752 B2 | 3/2009 | Gunneskov et al. | |
| 7,517,194 B2 | 4/2009 | Doorenspleet et al. | |
| 7,530,168 B2 | 5/2009 | Sorensen et al. | |
| 7,625,185 B2 | 12/2009 | Wobben | |
| 7,758,313 B2 | 7/2010 | Eyb | |
| 7,942,637 B2 | 5/2011 | Akhtar et al. | |
| 7,963,747 B2 | 6/2011 | Cairo | |
| 7,966,726 B2 | 6/2011 | Schibsbye | |
| 7,988,423 B2 | 8/2011 | Hancock | |
| 8,025,485 B2 | 9/2011 | Jacobsen | |
| 8,043,067 B2 | 10/2011 | Kuroiwa et al. | |
| 8,047,798 B2 | 11/2011 | Bech | |
| 8,066,490 B2 | 11/2011 | Babu et al. | |
| 8,079,818 B2 | 12/2011 | Burchardt et al. | |
| 8,105,040 B2 | 1/2012 | Vronsky et al. | |
| 8,114,329 B2 | 2/2012 | Karem | |
| 8,157,939 B2 | 4/2012 | Stiesdal | |
| 8,168,027 B2 | 5/2012 | Jacobsen et al. | |
| 8,172,538 B2 | 5/2012 | Hancock et al. | |
| 8,186,960 B2 | 5/2012 | Dawson et al. | |
| 8,192,169 B2 | 6/2012 | Piasecki | |
| 8,337,163 B2 | 12/2012 | Nies | |
| 8,348,622 B2 | 1/2013 | Bech | |
| 8,353,674 B2 | 1/2013 | Bech | |
| 8,382,440 B2 | 2/2013 | Baker et al. | |
| 8,506,258 B2 | 8/2013 | Baker et al. | |
| 8,529,717 B2 | 9/2013 | Hedges et al. | |
| 8,540,491 B2 | 9/2013 | Gruhn et al. | |
| 8,545,182 B2 | 10/2013 | Sorenson | |
| 8,545,744 B2 | 10/2013 | Jones | |
| 8,721,829 B2 | 5/2014 | Jacobsen et al. | |
| 8,727,731 B2 | 5/2014 | Bendel et al. | |
| 8,777,578 B2 | 7/2014 | Hancock et al. | |
| 9,073,270 B2 | 7/2015 | Bech | |
| 9,180,630 B2 | 11/2015 | Madsen et al. | |
| 9,234,497 B2 | 1/2016 | Grove-Nielsen | |
| 9,470,205 B2 | 10/2016 | Liu et al. | |
| 9,500,179 B2 | 11/2016 | Arendt et al. | |
| 9,567,749 B2 | 2/2017 | Hayden et al. | |
| 9,683,545 B2 | 6/2017 | Randall | |
| 2004/0140587 A1 | 7/2004 | Hadley | |
| 2006/0175731 A1 | 8/2006 | Bech et al. | |
| 2007/0140863 A1 | 7/2007 | Eyb et al. | |
| 2007/0160479 A1 | 7/2007 | Livingston et al. | |
| 2007/0189902 A1 | 8/2007 | Mohamed | |
| 2007/0189903 A1 | 8/2007 | Eyb | |
| 2008/0159871 A1 | 7/2008 | Bech | |
| 2008/0181781 A1 | 7/2008 | Livingston et al. | |
| 2008/0206059 A1 | 8/2008 | Hancock et al. | |
| 2009/0068017 A1 | 3/2009 | Rudling | |
| 2009/0175731 A1 | 7/2009 | Burchardt et al. | |
| 2009/0196756 A1 | 8/2009 | Althoff | |
| 2009/0220747 A1 | 9/2009 | Karem | |
| 2010/0084079 A1 | 4/2010 | Hayden et al. | |
| 2010/0290912 A1 | 11/2010 | Sorensen | |
| 2010/0310380 A1 | 12/2010 | Bech | |
| 2011/0031758 A1 | 2/2011 | Mitsuoka et al. | |
| 2011/0037191 A1 | 2/2011 | Stiesdal | |
| 2011/0044817 A1 | 2/2011 | Bendel et al. | |
| 2011/0135485 A1 | 6/2011 | Wang | |
| 2011/0171038 A1 | 7/2011 | Esaki et al. | |
| 2012/0027609 A1* | 2/2012 | Ogde | B29C 70/86 |
| | | | 416/226 |
| 2012/0039720 A1 | 2/2012 | Bech | |
| 2012/0183408 A1 | 7/2012 | Noerlem | |
| 2012/0207607 A1 | 8/2012 | Mironov | |
| 2012/0237356 A1 | 9/2012 | Mironov | |
| 2012/0308394 A1* | 12/2012 | Gruhn | B29B 11/16 |
| | | | 416/226 |
| 2013/0111752 A1 | 5/2013 | Madsen et al. | |
| 2013/0209257 A1 | 8/2013 | Feigl | |
| 2013/0285284 A1 | 10/2013 | Moeller Larsen et al. | |
| 2013/0333823 A1 | 12/2013 | Hedges et al. | |
| 2014/0003956 A1 | 1/2014 | Lull et al. | |
| 2014/0140853 A1 | 5/2014 | Feigl | |
| 2014/0154091 A1 | 6/2014 | Baker et al. | |
| 2014/0234109 A1 | 8/2014 | Hayden et al. | |
| 2014/0234114 A1* | 8/2014 | Schibsbye | F03D 1/0675 |
| | | | 416/226 |
| 2014/0271198 A1 | 9/2014 | Liu et al. | |
| 2014/0271217 A1 | 9/2014 | Baker | |
| 2014/0301859 A1 | 10/2014 | Hancock et al. | |
| 2015/0023799 A1 | 1/2015 | Wetzel et al. | |
| 2015/0217535 A1 | 8/2015 | Sayyar Bidgoli et al. | |
| 2015/0224721 A1 | 8/2015 | Bendel et al. | |
| 2015/0224759 A1 | 8/2015 | Boon | |
| 2015/0224760 A1 | 8/2015 | Eyb et al. | |
| 2015/0316027 A1 | 11/2015 | Sandercock | |
| 2015/0337797 A1 | 11/2015 | Grove-Nielsen | |
| 2015/0354531 A1 | 12/2015 | Kratmann | |
| 2015/0354542 A1 | 12/2015 | Kratmann | |
| 2015/0361950 A1 | 12/2015 | Pipo Benito | |
| 2016/0040651 A1 | 2/2016 | Yarbrough et al. | |
| 2016/0047252 A1* | 2/2016 | Merzhaeuser | B29C 70/00 |
| | | | 416/229 A |
| 2016/0047355 A1 | 2/2016 | Feigl | |
| 2016/0053741 A1 | 2/2016 | Sabbadin | |
| 2016/0146184 A1 | 5/2016 | Caruso et al. | |
| 2016/0146185 A1 | 5/2016 | Yarbrough et al. | |
| 2016/0160837 A1 | 6/2016 | Geiger et al. | |
| 2016/0167267 A1 | 6/2016 | Laight | |
| 2016/0169195 A1 | 6/2016 | Johnson et al. | |
| 2016/0263844 A1 | 9/2016 | Smith | |
| 2016/0273516 A1 | 9/2016 | Smith et al. | |
| 2016/0281680 A1 | 9/2016 | Randall | |
| 2016/0319801 A1 | 11/2016 | Smith | |
| 2017/0074241 A1 | 3/2017 | Koike | |
| 2017/0082087 A1 | 3/2017 | Yarbrough et al. | |
| 2017/0082089 A1* | 3/2017 | Yarbrough | F03D 1/0675 |
| 2017/0114773 A1 | 4/2017 | Riahi et al. | |

FOREIGN PATENT DOCUMENTS

| | | |
|---|---|---|
| CN | 102024518 A | 4/2011 |
| CN | 102024518 B | 4/2011 |
| CN | 103817952 A | 5/2014 |
| CN | 104859160 A | 8/2015 |
| CN | 103921457 B | 3/2016 |

(56) References Cited

FOREIGN PATENT DOCUMENTS

| | | |
|---|---|---|
| CN | 105881936 A | 8/2016 |
| CN | 105904746 A | 8/2016 |
| DE | 102011051172 A1 | 12/2012 |
| DE | 102012219224 B3 | 3/2014 |
| DE | 102015007289 A1 | 12/2016 |
| DE | 102015007801 A1 | 12/2016 |
| DK | 200801457 A | 9/2009 |
| EP | 1808598 A1 | 7/2007 |
| EP | 1956235 A1 | 8/2008 |
| EP | 2113373 A1 | 11/2009 |
| EP | 2441571 A1 | 4/2012 |
| EP | 2181834 B1 | 9/2012 |
| EP | 2617558 A1 | 7/2013 |
| EP | 2677170 A1 | 12/2013 |
| EP | 2682256 A1 | 1/2014 |
| EP | 2752577 A2 | 7/2014 |
| EP | 3034865 A1 | 6/2016 |
| JP | 2002137307 A | 5/2002 |
| JP | 2003293935 A | 10/2003 |
| KR | 101590795 B1 | 2/2016 |
| NL | 8104019 A | 3/1983 |
| WO | WO95/02496 | 1/1995 |
| WO | WO03082551 A1 | 10/2003 |
| WO | WO2009/085041 A1 | 7/2009 |
| WO | WO2009/095175 A2 | 8/2009 |
| WO | WO2009/133143 A1 | 11/2009 |
| WO | WO2010/083921 A2 | 7/2010 |
| WO | WO2010/149806 A1 | 12/2010 |
| WO | WO2011/113812 A1 | 9/2011 |
| WO | WO2012/140039 A2 | 10/2012 |
| WO | WO2012/140039 A3 | 10/2012 |
| WO | WO2012/161741 A2 | 11/2012 |
| WO | WO2013/087078 A1 | 6/2013 |
| WO | WO2014/044280 A1 | 3/2014 |
| WO | WO2014/063944 A1 | 5/2014 |
| WO | WO2014/079456 A1 | 5/2014 |
| WO | WO2014/147222 A2 | 9/2014 |
| WO | WO2015/142904 A1 | 9/2015 |
| WO | WO 2016/101953 A1 | 6/2016 |

OTHER PUBLICATIONS

Feng, et al., Mechanical Analysis of Stress Distribution in a Carbon Fiber-Reinforced Polymer Rod Bonding Anchor, Polymers, http://www.mdpi.com/2073-4360/6/4/1129, 2014, vol. 6, pp. 1129-1143.
Mason, Autoclave Quality Outside the Autoclave, CompositesWorld, https://www.compositesworld.com/articles/autoclave-quality-outside-the-autoclave, Mar. 1, 2006, 7 pages.
Marske, Graphlite Carbon Rod, internet web capture from https://www.ihpa.ie/carbon-dragon/index.php/home-top/articles/83-graphlite-carbon-rod, 8 pages.
Van Dijk, Pultrusion Products, DPP: pultmsion rectangular carbon fiber rod/strip, epoxy, 2011, 6 pages.
U.S. Appl. No. 15/399,238, filed Jan. 5, 2017.
U.S. Appl. No. 15/628,900, filed Jun. 21, 2017.
U.S. Appl. No. 15/628,933, filed Jun. 21, 2017.
U.S. Appl. No. 15/428,568, filed Feb. 13, 2017.
U.S. Appl. No. 15/428,620, filed Feb. 13, 2017.
Extended European Search Report, dated Apr. 2, 2019.

* cited by examiner

WIND TURBINE ROTOR BLADE COMPONENTS FORMED USING PULTRUDED RODS

FIELD

The present subject matter relates generally to wind turbine rotor blades of and, more particularly, to wind turbine rotor blade components formed using pultruded rods.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance, and strength of the rotor blade, the body shell is typically reinforced using one or more structural components (e.g. opposing spar caps with a shear web configured therebetween) that engage the inner surfaces of the shell halves. The spar caps may be constructed of various materials, including but not limited to glass fiber laminate composites and/or carbon fiber laminate composites. Such materials, however, can be difficult to control, defect prone, and/or highly labor intensive due to handling of the dry and pre-preg fabrics and the challenges of infusing large laminated structures.

As such, spar caps may also be constructed of pre-fabricated, pre-cured (i.e. pultruded) composites that can be produced in thicker sections, and are less susceptible to defects. In addition, the use of pultrusions in spar caps can decrease the weight thereof and may also increase the strength thereof. Accordingly, the pultruded composites can eliminate various concerns and challenges associated with using dry fabric alone. As used herein, the terms "pultruded composites," "pultrusions," "pultruded members" or similar generally encompass reinforced materials (e.g. fibers or woven or braided strands) that are impregnated with a resin and pulled through a stationary die such that the resin cures or undergoes polymerization through added heat or other curing methods. As such, the process of manufacturing pultruded composites is typically characterized by a continuous process of composite materials that produces composite parts having a constant cross-section. A plurality of pultrusions can then be joined together to form the spar caps and/or various other rotor blade components.

Thus, spar caps formed using pultrusions usually include pultrusion-formed layers bonded together via a resin material. More specifically, spar caps are generally formed of a plurality of stacked pultruded plates that are bonded together in a mold.

Though the benefits of using pultruded plates in spar caps have been realized, inherent properties of such plates or layers present design challenges. For example, using plate-shaped pultrusions to form curved-shaped components. More specifically, many pultrusions have a flat cross-section (e.g. are square or rectangular) as such shapes are easy to manufacture. Though the use of flat pultrusions can offer a significant improvement in cost and producibility of rotor blade components, such pultrusions do not typically lay into curved molds without gaps between the pultrusions and the mold shape. Since wind turbine blades are often curved from root to tip, challenges exist to form pultruded layers that curve with the blade shell. When plates containing different fibers are utilized in the same component, modulus mismatch can become problematic. For instance, substantial differences in the elastic modulus between plates can cause delamination to occur between the plates.

Conformance to the mold can be achieved to a certain degree by cutting the pultrusions into thinner strips; however, this increases the cost of the pultrusion process, machining time, and/or the difficulty of placing the pultrusions into the mold. In addition, the use of pultruded layers creates a concern for crack propagation. More specifically, cracks in a pultruded layer tend to migrate from end to end in a relatively short amount of time.

Accordingly, the art is continuously seeking new and improved methods of manufacturing rotor blade components, such as spar caps, using pultrusions. More specifically, methods of manufacturing rotor blade components using pultruded rods that provide more flexibility to the component such that the component can adhere to curved surfaces of the rotor blade would be advantageous. A crack in a rotor blade component utilizing pultruded rods tends to move in a zig-zag manner around the pultruded rods, which leads to a longer propagation life.

BRIEF DESCRIPTION

Aspects and advantages of the invention will be set forth in part in the following description, or may be obvious from the description, or may be learned through practice of the invention.

In one aspect, the present disclosure is directed to a rotor blade component for a wind turbine. The rotor blade component includes an enclosed primary outer casing and a plurality of pultruded rods. The enclosed primary outer casing defines a hollow interior. The plurality of pultruded rods is received within the hollow interior of the primary outer casing and secured therein via a first resin material. Further, an arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component.

In one embodiment, the plurality of pultruded rods may include a first fiber volume fraction of from about 60% to about 80%. In another embodiment, primary outer casing, the plurality of pultruded rods, and the first resin material together may include a second fiber volume fraction of from about 50% to about 70%. In other embodiments, the maximum diameter of each of the plurality of pultruded rods corresponds to a diameter thereof. Further, the diameter of each of the plurality of pultruded rods may be less than about 10% of a maximum dimension of the enclosed outer casing. More specifically, in one embodiment, the diameter of each of the plurality of pultruded rods may range from about 0.5 millimeters (mm) to about 40 mm. In a further embodiment the enclosed primary outer casing may be constructed of a plurality of fibers joined together via a second resin material.

In additional embodiments, the primary outer casing may include a root end and a tip end, the enclosed primary outer casing being curved between said root end and said tip end. In one embodiment, a cross-sectional area of the primary outer casing may taper between the root end and the tip end. Still, in a further embodiment, the primary outer casing may define a wall thickness that varies between the root end to the tip end.

In further embodiments, a plurality of enclosed additional enclosed casings may be arranged within the primary outer casing. At least a portion of the plurality of rods is received within each of the enclosed additional enclosed casings. In another embodiment, the rotor blade component may include a filler material received and secured within the enclosed primary outer casing via the first resin material.

In yet another embodiment, the primary outer casing may include a plurality of cavities arranged in a side-by-side configuration in a chord-wise direction of the rotor blade. At least two of the plurality of cavities includes at least a portion of the plurality of pultruded rods and at least one of the plurality of cavities includes a filler material.

In a further embodiment, the rotor blade component may further include at least one pultruded plate. The pultruded plate may be joined with the exterior of the primary outer casing and secured there via a third resin material.

In another aspect, the present disclosure is directed to a rotor blade assembly for a wind turbine. The rotor blade assembly includes a rotor blade. The rotor blade includes a suction side, a pressure side, a leading edge, and a trailing edge extending between a blade root and a blade tip. The rotor blade assembly also includes at least one rotor blade component arranged within the rotor blade. The rotor blade component includes an enclosed primary outer casing extending in a span-wise direction of the rotor blade from the blade root towards the blade tip. The enclosed primary outer casing includes at least one cavity and a plurality of pultruded rods. The plurality of pultruded rods is received and secured within the at least one cavity via a first resin material. An arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component.

In additional embodiments, the plurality of pultruded rods may include at least one of carbon or glass fibers. A ratio of pultruded rods formed from glass fibers to pultruded rods formed from carbon fibers may vary along the span-wise direction.

In a further embodiment, the rotor blade assembly may include a plurality of enclosed additional enclosed casings arranged within the primary outer casing. At least a portion of the plurality of rods is received within each of the enclosed additional enclosed casings. In another embodiment, the enclosed primary outer casing may include a plurality of cavities arranged in a side-by-side configuration in a chord-wise direction of the rotor blade.

In yet another aspect, the present disclosure is directed to a method of manufacturing a rotor blade component of a wind turbine. The method includes providing an enclosed outer casing. Another step includes arranging a plurality of pultruded rods within the enclosed outer casing in a plurality of rows and columns. An arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component. Yet another step includes sealing the outer casing at opposing ends thereof. The method also includes infusing at least one resin material into the outer casing to secure the plurality of pultruded rods therein so as to form the rotor blade component.

In other embodiments, the rotor blade component may include at least one of a spar cap, a shear web, a root ring, or an edgewise stiffening reinforcement. Still in further embodiments, the enclosed primary outer casing may be formed via at least one of pultrusion, thermoforming, or infusion.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
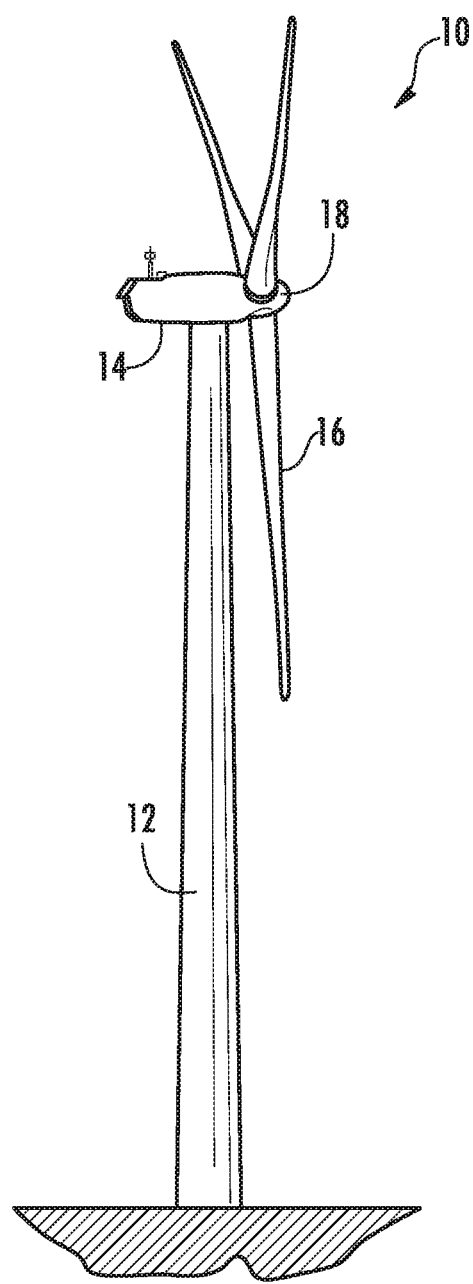
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to improved pultruded rotor blade components for wind turbines and methods of manufacturing the same. For example, in one embodiment, the rotor blade components described herein may be formed using a plurality of pultruded rods arranged in an enclosed primary outer casing. The enclosed primary outer casing defines a hollow interior extending between a root end and an opposing tip end. Each of the plurality of pultruded rods is received within the enclosed primary outer casing and secured therein via a first resin material. As such, the outer casing acts as both the component mold and part of the finished part. Further, an arrangement of the plurality of pultruded rods within the enclosed primary outer casing and a maximum dimension of the pultruded rods are configured to maximize the flexibility of the rotor blade component.

As such, flexibility of the part can be adjusted by changing the number of pultruded rods, the cross-sectional area of the pultruded rods, the fiber volume fraction of the pultruded rods, and/or the ratio of the cross-sectional area of the pultruded rods to the hollow cross-sectional area of the enclosed primary outer casing.

The present disclosure provides many advantages not present in the prior art. For example, the use of pultruded materials in spar caps and other rotor blade components can reduce defects and increase the strength of the component. Further, rotor blade components of the present disclosure that are formed via pultruded rods are more flexible (as compared to pultruded plates) and therefore more capable of conforming to a curved cavity that can be better incorporated into a curved rotor blade mold. Moreover, rotor blade components of the present invention can have better crack propagation characteristics versus a pultruded plate. In addition, components utilizing rods containing different fibers can avoid the delamination issue possible with plates formed from different fibers. More specifically, the smaller shape and geometry of the rods can prevent extreme modulus jumps that can lead to delamination.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
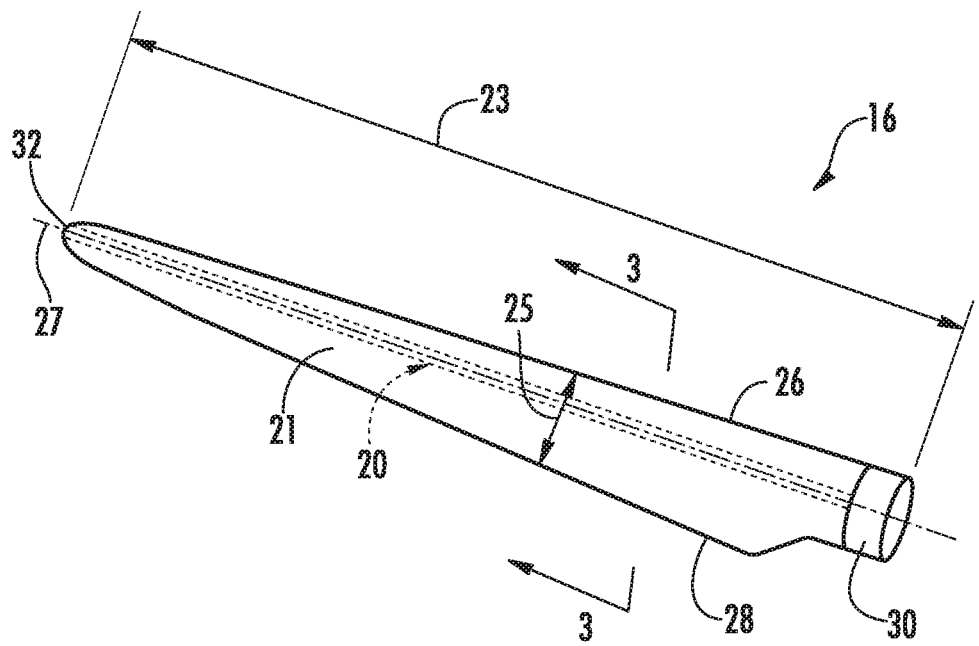
FIG. 2 illustrates a perspective view of one of the rotor blades of FIG. 1.
Figure 3:
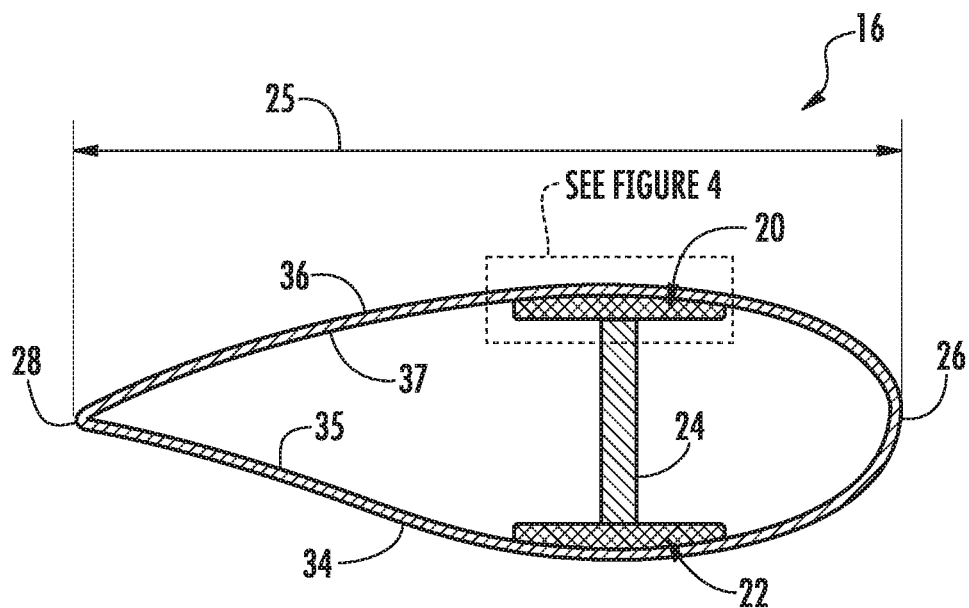
FIG. 3 illustrates a cross-sectional view of the rotor blade of FIG. 2 along line 3-3.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trailing edge 28. As is generally understood, the chord 25 may vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance, and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

Figure 4:
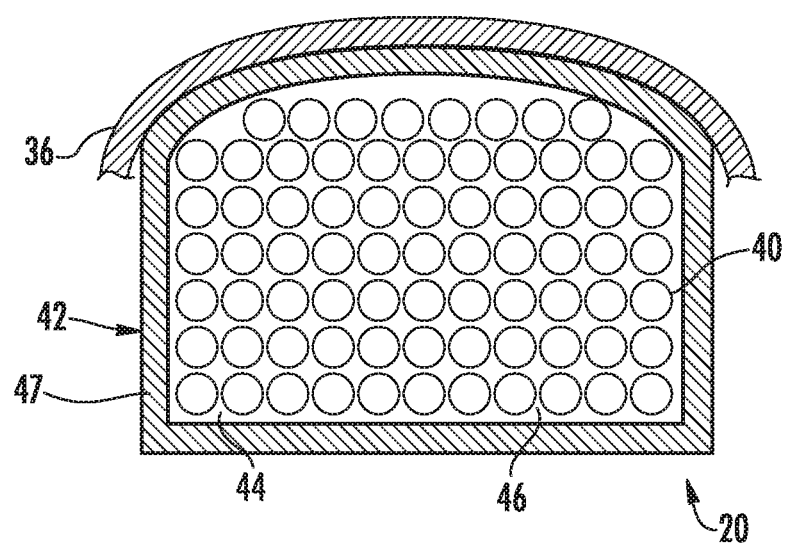
FIG. 4 illustrates a cross-sectional view of one embodiment of a pultruded spar cap formed using pultruded rods according to the present disclosure.
Figure 5:
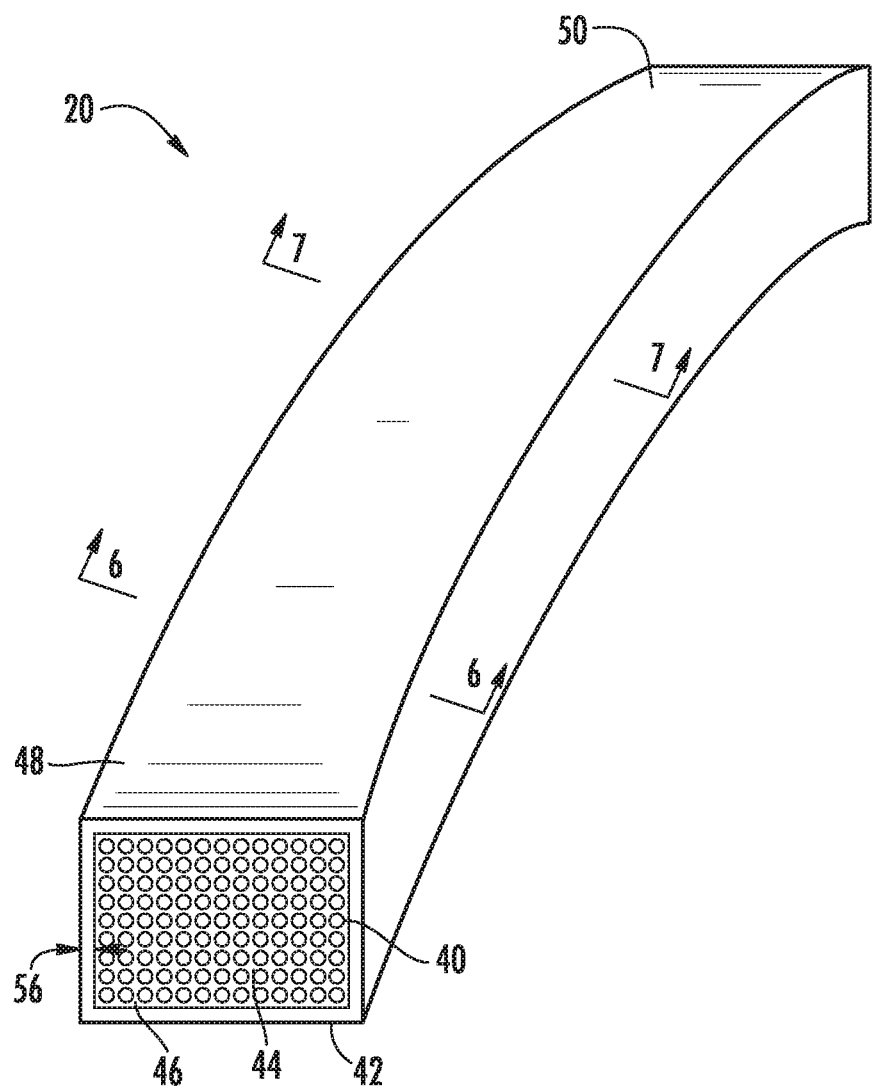
FIG. 5 illustrates a perspective, span-wise view of one embodiment of a spar cap formed using pultruded rods according to the present disclosure.
Figure 6:
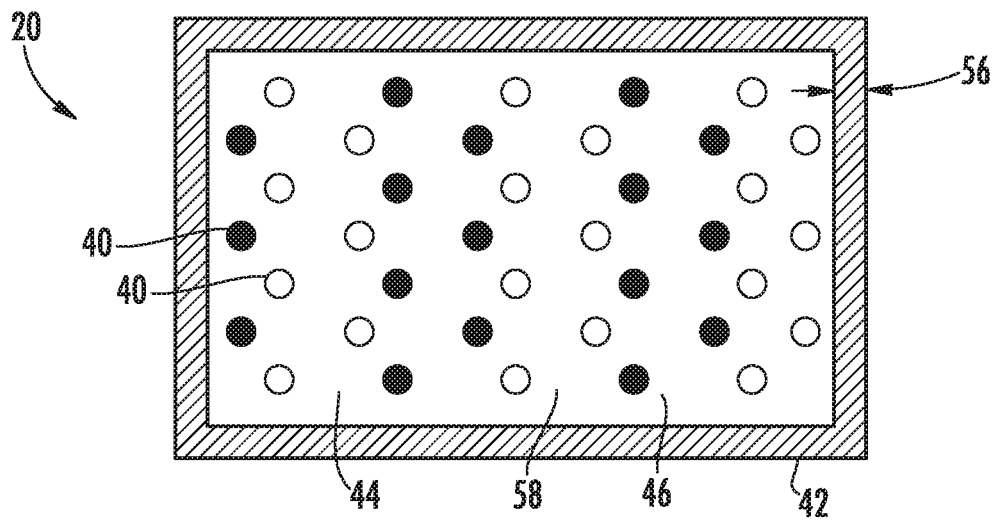
FIG. 6 illustrates a cross-sectional view of the spar cap of FIG. 5 along section line 6-6.
Figure 7:
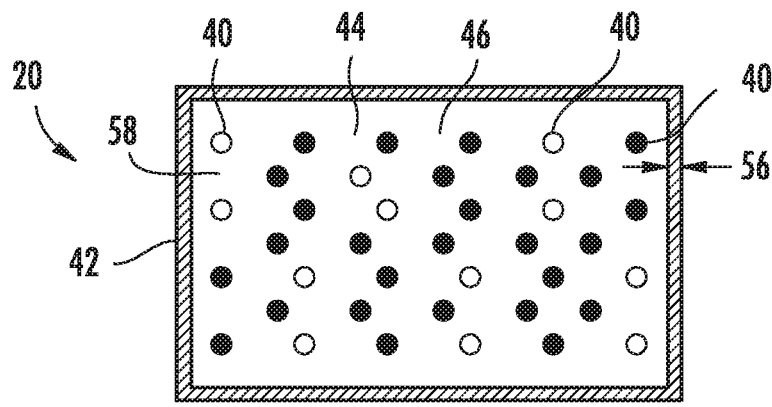
FIG. 7 illustrates another cross-sectional view of the spar cap of FIG. 5 along section line 7-7.

Referring now to FIGS. 4-7, various views of a spar cap 20 according to the present disclosure are illustrated. In particular, FIG. 4 illustrates a cross-sectional view of the spar cap 20 secured to the suction side 36 of the body shell 21 of the rotor blade 16. FIG. 5 illustrates a perspective span-wise view of the spar cap 20 according to the present disclosure. FIG. 6 illustrates a cross-sectional view of the spar cap 20 of FIG. 5 along sectional line 6-6. FIG. 7 illustrates a cross-sectional view of the spar cap 20 of FIG. 5 along sectional line 7-7 shown in FIG. 5.

More specifically, as shown, the spar cap 20 is constructed of an enclosed primary outer casing 42 having a hollow interior 44 configured to receive a plurality of pultruded rods 40 therein. Further, as shown, the pultruded rods 40 are secured within the hollow interior 44 of the primary outer casing 42 via a first resin material 46. In addition, the primary outer casing 42 described herein may be constructed of a plurality of fibers joined together via a second resin material 47. Moreover, as shown particularly in FIG. 4, the hollow interior 44 may extend between a root end 48 and a tip end 50 in a generally span-wise direction. Further, as shown, the spar cap 20 may be curved between the root end 48 and the tip end 50. As such, the plurality of pultruded rods 40 are sized to provide flexibility to the spar cap 20 such that the spar cap 20 can conform to the curvature of the rotor blade 16. In other embodiments, the spar cap 20 may be formed in segments of pultruded rods 40 housed in outer casings 42. More specifically, segments of a spar cap 20 may be joined together using scarf joints or other methods for adhering multiple segments together.

In some embodiments, the pultruded rods 40 may include a first fiber volume fraction of from about 60% to about 80%. More specifically, in certain embodiments, the first fiber volume fraction may be about 69%. In further embodiments, the combined enclosed primary outer casing 42, the plurality of pultruded rods 40, and the first resin material together may include a second fiber volume fraction of from about 50% to about 70%. More specifically, in certain embodiments, the second fiber volume fraction may be about 58%. As used herein, a fiber volume fraction is generally defined as the ratio of the volume of the fiber strands to the volume of both the fiber strands and resin as a percentage.

In other embodiments, the maximum diameter of each of the plurality of pultruded rods corresponds to a diameter thereof. Further, the diameter of each of the plurality of rods may be less than about 10% of a maximum dimension of the enclosed outer. A used herein, the maximum dimension of the enclosed outer casing is the maximum dimension in the chord-wise direction of the outer casing. In some embodiments, each of the plurality of pultruded rods may have a diameter ranging from about 0.5 mm to about 40 mm. As such, the diameter of each of the pultruded rods 40, which corresponds to the maximum dimension thereof, is configured to maximize the flexibility of the rotor blade component. For example, the diameter of the pultruded rods 40 is generally correlated with the fiber volume fraction of the rods 40. As such, pultruded rods 40 with larger diameters generally tend to have lower fiber volume fractions. In contrast, pultruded rods 40 with smaller diameters generally tend to have higher fiber volume fractions, which, in regard to flexibility, is favorable. Furthermore, in certain embodiments, pultruded rods 40 of varied diameters may be utilized in forming the rotor blade components described herein in order to achieve the desired fiber volume fraction.

Referring now generally to FIGS. 5-7, in certain embodiments, the hollow interior 44 of the enclosed primary outer casing 42 may vary from the root end 48 to the tip end 50. For example, as shown in FIG. 5, the hollow interior 44 of the enclosed primary outer casing 42 may taper between the root end 48 and the tip end 50. More specifically, as shown particularly in FIGS. 6 and 7, a cross-sectional area 58 of the hollow interior 44 closer to the blade root 30 may be larger than the cross-sectional area 58 of the hollow interior 44 closer to the blade tip 32.

In addition, as shown particularly in FIGS. 5-7, the hollow interior 44 of the enclosed primary outer casing 42 may define a wall thickness 56 that varies between the root end 48 to the tip end 50. More specifically, FIG. 6 illustrates the wall thickness 56 closer to the blade root 30 being larger than the thickness 56 closer to the blade tip 32. In still further embodiments, the wall thickness 56 of the outer casing 42 may be constant from the root end 48 to the tip end 50.

It should be understood that the pultruded rods 40 described herein may be formed using any suitable pultrusion process. For example, the pultruded rods 40 are generally formed of reinforced materials (e.g. fibers or woven or braided strands) that are impregnated with a resin material and pulled through a stationary die such that the resin material cures or undergoes polymerization through added heat or other curing methods. For example, in certain embodiments, the heated die may include a mold cavity corresponding to the desired shape of pultruded rods 40 such that the mold cavity forms the desired shape in the completed part. Similarly, the enclosed primary outer casing 42 may be formed using any suitable process, including but not limited to pultrusion, thermoforming, or infusion.

As such, in various embodiments, the fibers may include but are not limited to glass fibers, nanofibers, carbon fibers, metal fibers, wood fibers, bamboo fibers, polymer fibers, ceramic fibers, or similar. In addition, the fiber material may include short fibers, long fibers, or continuous fibers.

Further, the resin materials described herein may include a thermoplastic material or a thermoset material. A thermoplastic material as described herein generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, a thermoset material as described herein generally encompasses a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, esters, epoxies, or any other suitable thermoset material.

Thus, in accordance with certain aspects of the present disclosure, the pultruded rods 40 can be then joined together within the outer casing 42 to form the spar cap 20. More specifically, the pultruded rods 40 may be joined and/or secured together via vacuum infusion, adhesive, semi-preg material, pre-preg material, or any other suitable joining method. In addition, as mentioned, the pultruded rods 40 are arranged in the outer casing 42 so as to maximize the flexibility of the spar cap 20.

In addition, it should be understood that the pultruded rods 40 may have any suitable cross-sectional shape. For example, as can be seen in FIG. 4, the cross-sectional shape of the pultruded rods 40 may correspond to a generally circular shape. In further embodiments, it should be recognized by those in the art that the cross-sectional shape of the pultruded rods 40 can be any desirable shape such as, but not limited to, square, rectangular, triangular, octagonal, diamond, or rebar. Such embodiments utilizing triangular or rectangular pultruded rods 40 may use a triangular and/or a rectangular packing arrangement respectively. It should be recognized that pultruded rods 40 of any shape may also be organized in a triangular and/or rectangular packing arrangement, and that more than one packing arrangement may be utilized in the same spar cap.

Referring particularly to FIGS. 6 and 7, the spar cap 20 may include pultruded rods 40 formed of carbon fibers (shaded) and/or glass fibers (non-shaded). As such, in certain embodiments, a ratio of the pultruded rods 40 formed from glass fibers to pultruded rods 40 formed from carbon fibers may vary along the span-wise direction. For example, as can be seen in FIG. 6, the ratio of pultruded rods 40 formed from glass fibers to pultruded rods 40 formed from carbon fibers is higher at the blade root 30. In contrast, as shown in FIG. 7, the ratio of pultruded rods 40 formed from glass fibers to pultruded rods formed 40 from carbon fibers is lower closer to the blade tip 32. As such, a change in the ratio of pultruded rods 40 formed from glass fibers to carbon fibers along the span of the rotor blade 16 allows for different properties from the blade root 30 to the blade tip 32.

Figure 8:
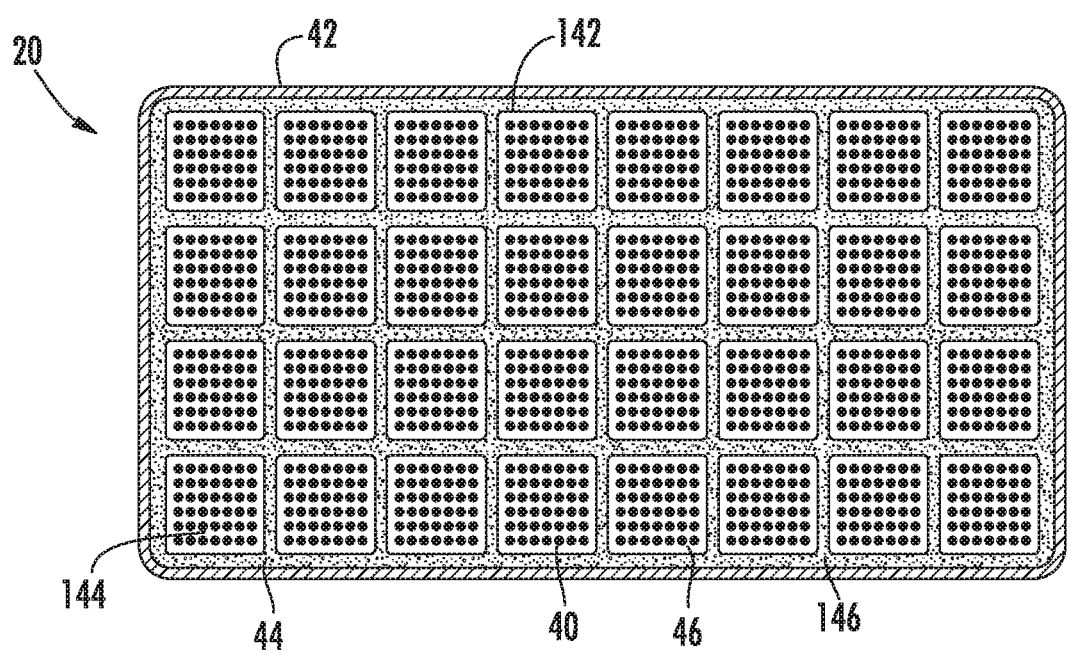
FIG. 8 illustrates a chord-wise view of a one embodiment of a spar cap according to the present disclosure, particularly illustrating a spar cap having an enclosed primary outer casing and multiple enclosed additional enclosed outer casings arranged therein with a plurality of pultruded rods arranged within each of the enclosed additional enclosed casings.

Referring now to FIG. 8, another embodiment of a spar cap 20 formed from pultruded rods 40 according to the present disclosure is illustrated. More specifically, as shown, the illustrated spar cap 20 includes a plurality of enclosed additional enclosed casings 142 arranged within the enclosed primary outer casing 42. Thus, as shown, the additional enclosed casings 142 include additional hollow interiors 144 each configured to receive a portion of the pultruded rods 40. For example, as shown, the spar cap 20 includes a plurality of additional enclosed casings 142 arranged in a plurality of rows and columns (e.g. a 4×8 matrix) with each additional enclosed casing 142 containing a plurality of pultruded rods 40 arranged therein in a plurality of rows and columns. In another embodiment, the primary enclosed casing 42 can contain a matrix of horizontal and/or vertical stiffening ribs separating at least some of the additional enclosed casings 142.

Further, as shown, the additional enclosed casings 142 are secured within the hollow interior 44 of the primary outer casing 42 using an additional resin material 146. Like the primary outer casing 42, the enclosed additional enclosed casings 142 may also be formed via pultrusion, thermoforming, and/or infusion. It should also be recognized that the enclosed primary outer casing 42, the enclosed additional enclosed casing 142, and/or the pultruded rods 40 of some embodiments are pre-cured, pre-fabricated components manufactured using any suitable methods known in the art.

Figure 9:
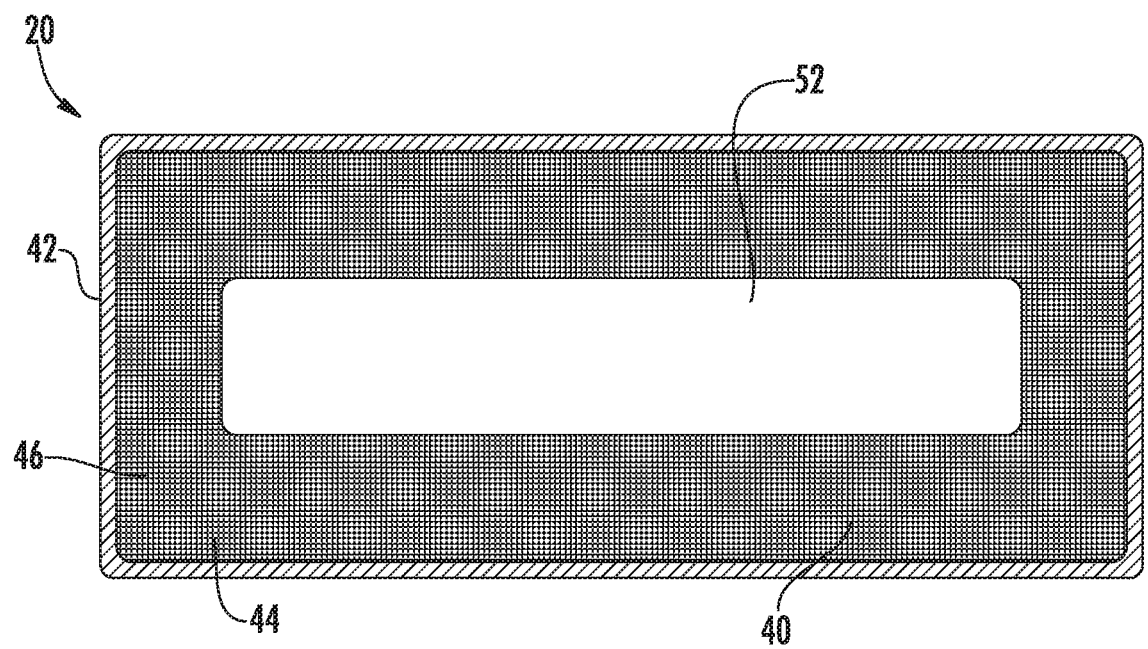
FIG. 9. illustrates one embodiment of a spar cap according to the present disclosure, particularly illustrating a spar cap containing a filler material arranged within an enclosed primary outer casing and a plurality of pultruded rods arranged around the filler material.

Referring now to FIG. 9, still another embodiment of a spar cap 20 formed from the primary outer casing 42 and the pultruded rods 40 according to the present disclosure is illustrated. More specifically, as shown, the spar cap 20 also includes at least one filler material 52. For example, as shown, the filler material 52 is received and secured within the enclosed primary outer casing 42 within the hollow interior 44 via the first resin material 46. In addition, as shown in the illustrated embodiment, the filler material 52 is centrally located and surrounded by the pultruded rods 40. In alternative embodiments, the filler material 52 may be located at any suitable location within the outer casing 42. Further, the filler material 52 may include any suitable material, including but not limited to high-density foam, low-density foam, stiffening ribs, a fluid (e.g. air), or other similar materials or fluids known in the art. In another embodiment, the hollow interior 44 may include a plurality of filler materials 52 arranged therein either together or separately.

In a further embodiment the filler material 52 may include a matrix of horizontal and/or vertical stiffening ribs configured to receive a portion of the pultruded rods in the each of the spaces between stiffening ribs. For example, the matrix of vertical and horizontal stiffening ribs may fill the hollow interior 44 with the first resin material 46 and the pultruded rods 40 filling the spaces between stiffening ribs.

Figure 10:
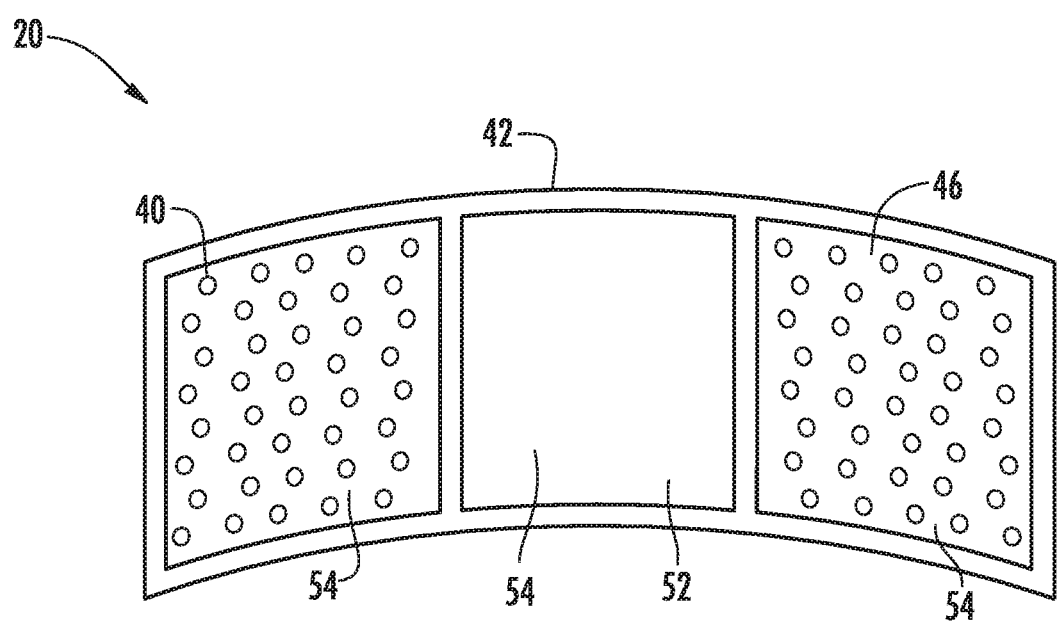
FIG. 10. illustrates a chord-wise view of one embodiment of a spar cap according to the present disclosure, particularly illustrating a spar cap having a plurality of cavities arranged in a side-by-side configuration with a plurality of pultruded rods contained within two of the cavities and an open middle cavity.
Figure 11:
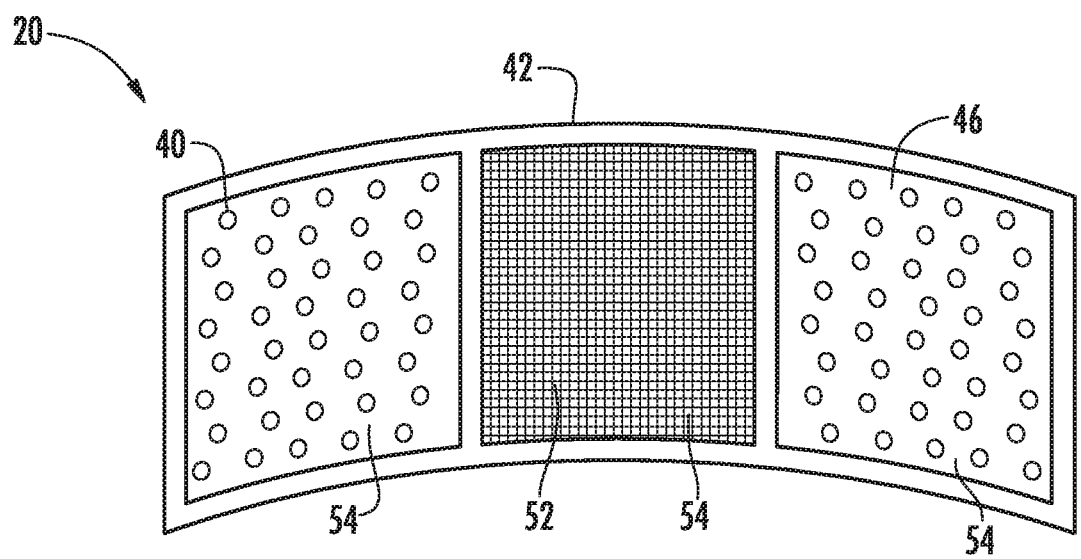
FIG. 11 illustrates a chord-wise view of one embodiment of a spar cap according to the present disclosure, particularly illustrating a spar cap having a plurality of cavities arranged in a side-by-side configuration with a plurality of pultruded rods contained within two of the cavities and a plurality of stiffening rods contained within a middle cavity.
Figure 12:
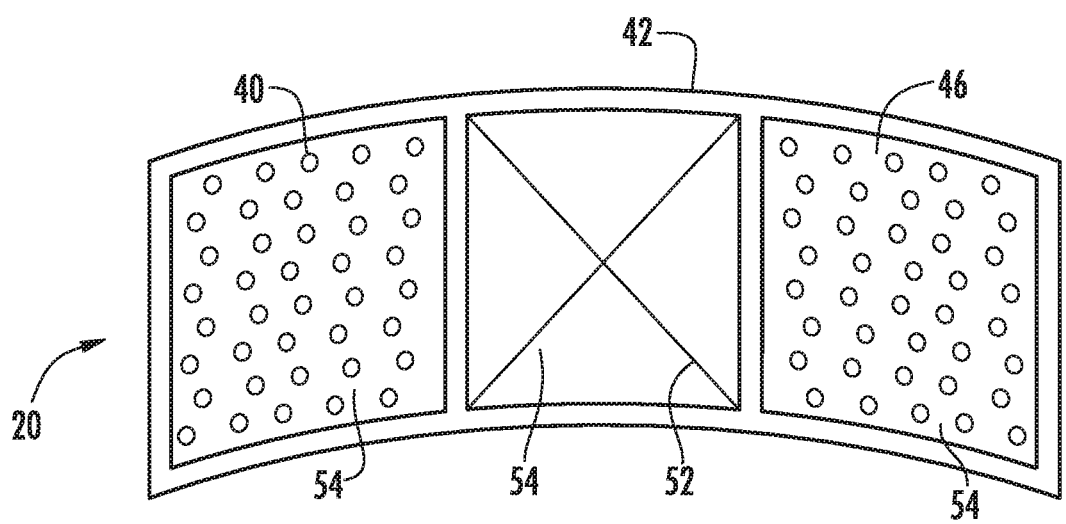
FIG. 12 illustrates a chord-wise view of one embodiment of a spar cap according to the present disclosure, particularly illustrating a spar cap having a plurality of cavities arranged in a side-by-side configuration with a plurality of pultruded rods contained within two of the cavities and a filler material contained within a middle cavity.

Referring now to FIGS. 10-12, further embodiments of rotor blades components formed from the primary outer casing 42 and the pultruded rods 40 according to the present disclosure is illustrated. More specifically, as shown, the spar cap 20 may include a plurality of hollow interiors or cavities 54 (rather than just a single hollow interior 44 as shown in FIG. 4). For example, as shown, the illustrated outer casing 42 includes three cavities 54. Further, it should be recognized that the spar cap 20 may include any number and/or orientation of cavities 54.

As such, one or more of the cavities 54 may be filled with the pultruded rods 40. For example, as shown particularly in FIG. 10, the enclosed primary outer casing 42 includes a plurality of cavities 54 arranged in a side-by-side configuration in the chord-wise direction with the outer cavities 54 containing pultruded rods 40. In addition, as shown, the center cavity 54 includes a filler material 52 such as those described herein. In particular, FIG. 10 illustrates an embodiment where the middle cavity 54 is an open cavity (i.e. the cavity 54 contains air). Such an open cavity 54 can be used as a conduit for power cables, an actuating medium (such as pressurized air) to operate active and/or passive devices, down conductor conduits to prevent damage from lighting, and/or hot air to heat the rotor blade 16. In contrast, FIG. 11 illustrates a rotor blade component in which the filler material 52 within the middle cavity 54 corresponds to stiffening ribs. In such embodiments, the stiffening ribs may also include an additional filler material such as foam arranged therein. Alternatively, the stiffening ribs may be simply filled with air. In still another embodiment, FIG. 12 illustrates rotor blade component in which the filler material 52 within the middle cavity 54 corresponds to a foam material (i.e. without the stiffening ribs).

Figure 13:
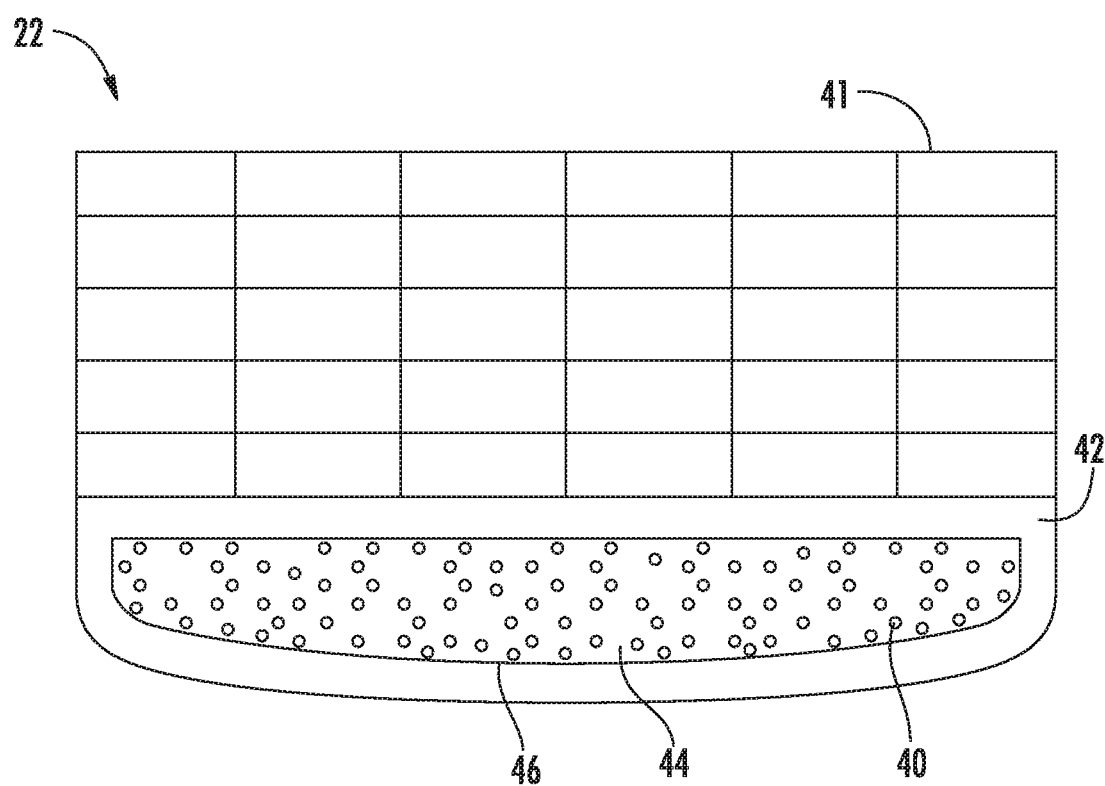
FIG. 13 illustrates a chord-wise view of one embodiment of a spar cap according to the present disclosure, particularly illustrating a spar cap having a plurality of pultruded plates joined with an outer casing filled with a plurality of pultruded rods.

Referring now to FIG. 13, a further embodiment of a spar cap 22 formed from the primary outer casing 42, pultruded rods 40, and pultruded plates 41 according to the present disclosure is illustrated. More specifically, in this embodiment the spar cap 22 is the lower spar cap 22 adhered to the pressure side 34 of the body shell 21 as shown in FIG. 3. As shown, the spar cap 22 can further include at least one pultruded plate 41. The at least one pultruded plate 41 can be joined with the exterior of the primary outer casing 42 and secured therein via a third resin material (not shown). More specifically, the pultruded plates 41 may be joined and/or secured together and/or to the primary outer casing 42 via vacuum infusion, adhesive, semi-preg material, pre-preg material, or any other suitable joining method. In some embodiments, as shown in FIG. 13, the spar cap 22 may include a plurality of pultruded plates 41 joined together and with the exterior of the primary outer casing 42. In a different embodiment, the pultruded plates 41 may be received and secured within the hollow interior 44 of the primary outer casing 42 using the first resin material 46.

Figure 14:
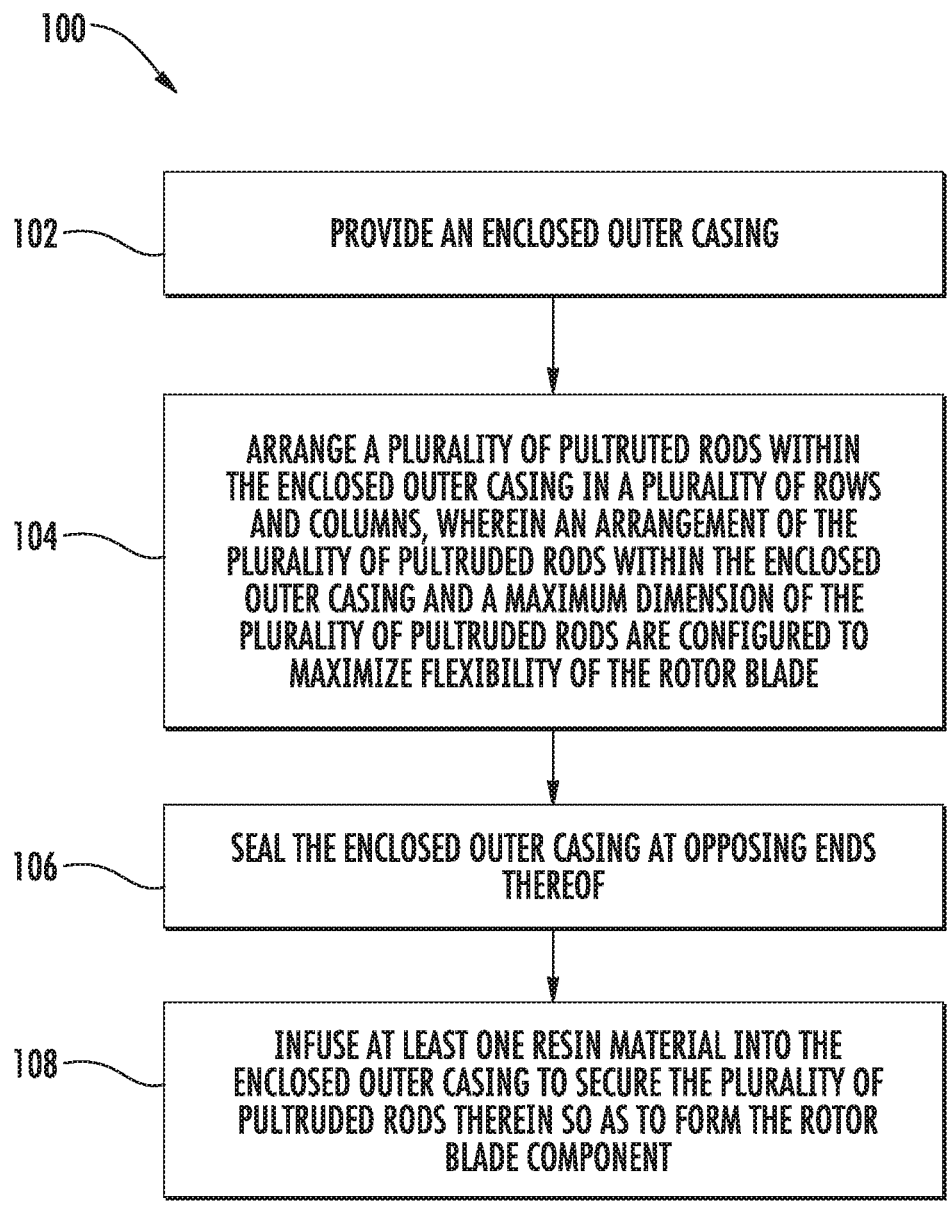
FIG. 14 illustrates a flow diagram of one embodiment of a method of manufacturing rotor blade components according to the present disclosure.

The present disclosure is also directed to methods for manufacturing rotor blade components as described herein. For example, as shown in FIG. 14, a flow diagram of one embodiment of a method 100 of manufacturing a rotor blade component of the wind turbine 10 is disclosed. As shown at 102, the method 100 includes providing an enclosed outer casing 42. As shown at 104, the method 100 includes arranging a plurality of pultruded rods 40 within the outer casing 42 in a plurality of rows and columns. More specifically, an arrangement of the pultruded rods 40 within the outer casing 42 and a maximum dimension of the pultruded rods 40 are configured to maximize the flexibility of the rotor blade component. As shown at 106, the method 100 also includes sealing the outer casing 42 at opposing ends thereof. As shown at 108, the method 100 includes infusing at least one resin material into the outer casing 42 to secure the pultruded rods 40 therein so as to form the rotor blade component.

It should also be understood that the plurality of pultruded rods 40, the primary outer casing 42, and the additional casings 142 as described herein may be used to construct various other rotor blade components, in addition to spar caps. For example, in certain embodiments, the components and methods described herein may be used to construct the shear web 24, a root ring, an edgewise stiffening reinforcement, or any other rotor blade component that can benefit from being constructed of pultruded parts as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade component for a wind turbine, the rotor blade component comprising:
    a pultruded enclosed primary outer casing defining a hollow interior having closed side walls and open opposing ends; and,
    a plurality of pultruded rods arranged in a plurality of rows and received within the hollow interior of the primary outer casing, the plurality of pultruded rods secured within the hollow interior via a first resin material,
    wherein an arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component.

2. The rotor blade component of claim 1, wherein each of the plurality of pultruded rods comprises a first fiber volume fraction of from 60% to 80% of an overall volume of each of the plurality of pultruded rods.

3. The rotor blade component of claim 1, wherein the primary outer casing, the plurality of pultruded rods, and the first resin material together comprise a second fiber volume fraction from 50% to 70% of an overall volume of the rotor blade component.

4. The rotor blade component of claim 1, wherein the maximum diameter of each of the plurality of pultruded rods corresponds to a diameter thereof, the diameter of each of the plurality of pultruded rods being less than 10% of the maximum dimension of the enclosed outer casing.

5. The rotor blade component of claim 1, wherein the enclosed primary outer casing is constructed of a plurality of fibers joined together via a second resin material.

6. The rotor blade component of claim 1, wherein the primary outer casing comprises a root end and a tip end, the enclosed primary outer casing being curved between said root end and said tip end.

7. The rotor blade component of claim 6, wherein a cross-sectional area of the primary outer casing tapers between said root end and said tip end.

8. The rotor blade component of claim 6, wherein the primary outer casing defines a wall thickness that varies between said root end to said tip end.

9. The rotor blade component of claim 1, further comprising a plurality of additional enclosed casings arranged within the primary outer casing, wherein at least a portion of the plurality of rods is received within each of the enclosed additional enclosed casings.

10. The rotor blade component of claim 1, further comprising a filler material received and secured within the enclosed primary outer casing via the first resin material.

11. The rotor blade component of claim 1, wherein the primary outer casing comprises a plurality of cavities arranged in a side-by-side configuration in a chord-wise direction of the rotor blade.

12. The rotor blade component of claim 11, wherein at least two of the plurality of cavities comprises at least a portion of the plurality of pultruded rods and at least one of the plurality of cavities comprises a filler material.

13. The rotor blade component of claim 1, wherein the rotor blade component comprises at least one of a spar cap, a shear web, a root ring, or an edgewise stiffening reinforcement.

14. The rotor blade component of claim 1, wherein the enclosed primary outer casing is formed via at least one of pultrusion, thermoforming, or infusion.

15. The rotor blade component of claim 1, further comprising at least one pultruded plate, wherein the at least one pultruded plate is joined with the exterior of the primary outer casing and secured there via a third resin material.

16. A rotor blade assembly for a wind turbine, the rotor blade assembly comprising:
a rotor blade comprising a suction side, a pressure side, a leading edge, and a trailing edge extending between a blade root and a blade tip; and,
at least one rotor blade component arranged within the rotor blade, the rotor blade component comprising:
a pultruded enclosed primary outer casing extending in a span-wise direction of the rotor blade from the blade root towards the blade tip, the enclosed primary outer casing comprising at least one hollow interior with closed side walls and open opposing ends; and,
a plurality of pultruded rods arranged in a plurality of rows and received within the at least one hollow interior and secured therein via a first resin material,
wherein an arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component.

17. The rotor blade assembly of claim 16, wherein the plurality of pultruded rods comprise at least one of carbon fibers and glass fibers, wherein a ratio of pultruded rods formed from glass fibers to pultruded rods formed from carbon fibers varies along the span-wise direction.

18. The rotor blade assembly of claim 16, further comprising a plurality of additional enclosed casings arranged within the primary outer casing, wherein at least a portion of the plurality of rods is received within each of the enclosed additional enclosed casings.

19. The rotor blade assembly of claim 16, wherein the enclosed primary outer casing comprises a plurality of cavities arranged in a side-by-side configuration in a chord-wise direction of the rotor blade.

20. A method of manufacturing a rotor blade component of a wind turbine, the method comprising:
forming an enclosed outer casing having at least one hollow interior via pultrusion;
arranging a plurality of pultruded rods within the at least one hollow interior of the enclosed outer casing in a plurality of rows and columns, wherein an arrangement of the plurality of pultruded rods within the primary outer casing and a relationship of a maximum dimension of each of the plurality of pultruded rods and a maximum dimension of the enclosed primary outer casing are configured to maximize flexibility of the rotor blade component;
sealing the outer casing at open opposing ends thereof; and,
infusing at least one resin material into the outer casing to secure the plurality of pultruded rods therein so as to form the rotor blade component.

* * * * *